United States Patent [19]

Lewis et al.

[11] Patent Number: 5,438,464
[45] Date of Patent: Aug. 1, 1995

[54] SYNCHRONIZATION OF MULTIPLE DISK DRIVE SPINDLES

[75] Inventors: William D. Lewis, Northboro; William F. Even, Auburn, both of Mass.

[73] Assignee: Quantum Corporation, Milpitas, Calif.

[21] Appl. No.: 54,652

[22] Filed: Apr. 23, 1993

[51] Int. Cl.⁶ .................................................. G11B 15/46
[52] U.S. Cl. ............................. 360/73.03; 360/73.03; 360/70
[58] Field of Search ................... 360/73.03, 73.02, 70, 360/71; 369/47, 50

[56] References Cited

U.S. PATENT DOCUMENTS

| | | | |
|---|---|---|---|
| 3,441,342 | 4/1969 | Ball et al. | 352/17 |
| 3,484,760 | 12/1969 | Perkins et al. | 340/174.1 |
| 3,503,058 | 3/1970 | Ault | 340/174.1 |
| 3,553,662 | 1/1971 | Goss | 340/174.1 |
| 3,864,750 | 2/1975 | Applequist | 360/105 |
| 3,893,178 | 7/1975 | Sordello | 360/73.02 |
| 3,911,488 | 10/1975 | Wood | 360/71 |
| 4,206,485 | 6/1980 | Sakamoto | 360/70 |
| 4,224,645 | 9/1980 | Mauch | 360/73.08 |
| 4,249,220 | 2/1981 | Yasutake et al. | 360/73.05 |
| 4,259,698 | 3/1981 | Takada | 360/70 |
| 4,278,924 | 7/1981 | Mawatari et al. | 388/814 |
| 4,622,499 | 11/1986 | Squires et al. | 318/254 |
| 4,658,307 | 4/1987 | Tsuyuguchi et al. | 360/69 |
| 4,780,866 | 10/1988 | Syracuse | 369/59 |
| 4,815,063 | 3/1989 | Aoshima et al. | 369/50 |
| 4,855,978 | 8/1989 | Kanamaru | 369/32 |
| 4,870,643 | 9/1989 | Bultman et al. | 371/11.1 |
| 4,907,105 | 3/1990 | Kurzweil, Jr. | 360/73.02 |
| 4,908,810 | 5/1990 | Oie | 369/50 |
| 4,920,462 | 4/1990 | Couse et al. | 360/78.04 |
| 4,978,902 | 12/1990 | Hatagami et al. | 318/608 |
| 5,008,763 | 4/1991 | Horino | 360/70 |
| 5,038,232 | 8/1991 | Grace | 360/73.03 |
| 5,067,033 | 11/1991 | Wakui | 360/70 |
| 5,079,654 | 1/1992 | Uno et al. | 360/78.14 |
| 5,117,315 | 5/1992 | Nagasaki et al. | 360/71 |
| 5,119,242 | 6/1992 | Murray | 360/14.2 |
| 5,128,812 | 7/1992 | Uno et al. | 360/73.06 |
| 5,159,503 | 10/1992 | Mitamura et al. | 360/73.03 |
| 5,237,466 | 8/1993 | Glaser et al. | 360/73.03 |
| 5,303,097 | 4/1994 | Baba et al. | 360/73.02 |

FOREIGN PATENT DOCUMENTS

| | | | |
|---|---|---|---|
| 0094492 | 11/1983 | European Pat. Off. | G11B 19/28 |
| 0404120 | 12/1990 | European Pat. Off. | G06F 3/06 |
| 0426483 | 5/1991 | European Pat. Off. | G11B 19/28 |
| 63-64687 | 3/1988 | Japan | C11B 27/10 |
| 04313859 | 11/1992 | Japan | G11B 19/28 |
| 04335255 | 11/1992 | Japan | G11B 19/02 |

OTHER PUBLICATIONS

Pending U.S. Patent Application Serial No. 07/721,044 filed Jun. 26, 1991, inventor Even, atty. docket No. PD91-0118.
Micro Linear ML4410 data sheet, Jul. 1992.
Unitrode UC1842 etc. data sheet, Feb. 1986.

Primary Examiner—Aristotelis Psitos
Assistant Examiner—Varjha A. Kapadia
Attorney, Agent, or Firm—David B. Harrison

[57] ABSTRACT

A disk drive in a multi-disk storage system has a spindle synchronizer and a spindle controller that are microprocessor-based. The spindle synchronizer has a counter used to track the phase of a master phase reference signal that is distributed to all the disk drives in the storage system. The counter may also optionally be used to generate the master reference signal. The spindle synchronizer also has programmable registers and a comparator that are used to generate a spindle reference signal having a programmable phase offset relative to the master reference signal, and a register used to sample the phase of the master reference once per revolution of its associated spindle. The spindle controller contains a counter used to measure the actual rotational period of the associated spindle. The spindle phase error is used in a phase correction algorithm that controls a reference voltage supplied to a motor spin controller. The algorithm employs frequency switching to phase-lock the associated spindle with the spindle reference signal generated by the spindle synchronizer.

16 Claims, 7 Drawing Sheets

SYNCHRONIZATION OF MULTIPLE DISK DRIVE SPINDLES

FIELD OF THE INVENTION

The invention relates to the field of disk drives for data processing systems, and in particular to the synchronization and phase locking of multiple disk drive spindles.

BACKGROUND OF THE INVENTION

Data storage systems often utilize several storage devices such as hard magnetic disk drives to provide adequate permanent data storage capacity. Each hard disk drive incorporates a multiple-disk stack mounted on a spindle and driven by a motor operated at a predetermined rotational speed; this arrangement is commonly referred to as a spindle-disk assembly or SDA. Data transfer to and from each disk drive is effected by means of a plurality of read/write transducers, such as magnetic read/write heads, each one of which is associated with a disk surface and is mounted on a common actuator mechanism. Each disk drive also typically has an associated spindle motor speed control circuit to maintain the rotational speed of the SDA within predetermined limits. 3600 RPM is a common rotational speed, but the trend is toward higher RPMs in order to increase the rate at which data can be read from or written to the disk drive.

When a number of independent disk drives are employed in a storage system, it is advantageous to synchronize their operation. In particular, it is advantageous to have precise phase alignment between disks in different drives in order to minimize unnecessary delays when switching from a disk in one drive a disk in another. This need for synchronism requires a higher degree of rotational control than is achieved by a set of independent speed controllers.

One known technique for achieving synchronous operation is to phase-lock the rotation of each disk drive to a single master reference signal. For example, it is possible to phase-lock a feedback signal indicative of spindle position to the master reference signal, and thereby phase-lock the spindle to the master reference signal. Such a scheme without further modification has only coarse phase-alignment resolution, because generally the feedback signal only indicates spindle position to the nearest rotor pole. Also, it still requires some way of aligning the information on the disk with the spindle, so that phase-aligning the spindles results in phase-aligned disks. This requirement burdens the manufacturing step of "servowriting", i.e., writing servo-mechanism-related information to the disk, in at least two ways: 1) the servowriter must somehow track the spindle motor rotation to ensure that the position information is aligned with the spindle; and 2) the servowriter and final product are constrained to use similar if not identical spindle controller hardware, which may be disadvantageous under some circumstances.

Another technique for achieving synchronous operation is to phase-lock the master reference signal with a disk-position signal that is derived from a pattern recorded on a disk in the disk drive. Because this technique relies on a disk-position signal rather than a spindle-position signal, it overcomes the above-mentioned problems of using spindle alignment. However, it also requires the continuous presence of the disk-position signal. In so-called "dedicated servo" systems, which have a dedicated disk surface for providing disk-position information, this requirement is not a problem. However, in modern "embedded-servo" systems, which obtain position information from data surfaces rather than a dedicated surface, the disk-position signal is occasionally interrupted, for example during head switches. After an interruption, the drive must re-acquire phase lock before disk accessing can continue, resulting in undesirable delay.

One example of synchronizing multiple disk spindles is shown in U.S. patent application Ser. No. 07/721,044 filed Jun. 26, 1991, entitled "Disk Storage System", inventor Even, assigned to Digital Equipment Corp. That system employs a modified version of the disk-position feedback system described above. It includes a trigger pulse modifier as part of the phase lock servo-mechanism. During startup operation of the disk drive, the trigger pulse modifier measures the phase difference between the master reference signal and a sector zero reference pulse generated from a reference pattern recorded on the disk. This phase difference is applied to a lookup table, the output of which is an integer indicating a number of cycles of phase shift to be applied to a sensor signal generated by sensors on the spindle. The phase-shifted signal is then applied, after suitable frequency division, as a feedback signal to a phase difference detector in the loop.

This system has the advantage of taking disk position into account during phase locking. And since the pulse modification only takes place during the startup phase, it does not rely on continuous disk position information. However, like the spindle-lock scheme it requires that the reference pattern must be aligned with the spindle, and also that the servowriter and final product use a similar controller. An improved technique, therefore, would achieve similar beneficial results while eliminating or substantially reducing these constraints, thereby simplifying the servowriting process and providing greater design flexibility.

SUMMARY OF THE INVENTION

The present invention is intended to address the problems discussed above as well as other more generic problems. In particular, the present invention has several objectives, including the following:

i) to synchronize the operation of multiple disk drives without imposing any predetermined limit on the number of disk drives allowed, thus enhancing scalability of the storage system;

ii) to achieve phase locking of the disk drives using digital hardware already required for speed control;

iii) to simplify the servowriting process, and to allow a servowriter to use different spindle control electronics than those in a final product;

iv) to avoid degrading operational characteristics such as availability and performance; and v) to enhance the testability of the disk drives.

The invention includes several features to achieve the objectives listed as well as others. According to the invention, circuitry in each disk drive determines during startup the phase offset between its disks and a single master reference signal that is common to all disk drives, and then adjusts the phase of its spindle relative to the master reference signal to attain fine-grain phase alignment. Phase offset is determined by sampling the phase of the master reference signal when the disk is in a predetermined position. The spindle-disk assembly provides separate indications of spindle and disk positions to synchronization and phase-locking subsystems.

Because the spindle and disk positions are independently indicated, the synchronization technique can determine an arbitrary phase offset between the spindle and servo information written on the disk. The invention further includes means for adjusting the spindle phase by very small increments. This feature obviates the necessity of precise servowriting during manufacturing, and also gives rise to the possibility of completely re-formatting (without re-servowriting) a disk in the field without requiring special tools or instruments.

A spindle reference signal is created for each disk drive, each signal having an adjustable phase offset relative to the master reference signal. In this way, each disk drive has its own independent sub-master reference so that the distributed synchronization technique can be carried out. Furthermore, in a preferred embodiment the hardware in all disk drives is the same; programmable features in the hardware enable a disk drive to operate as either a master or a slave. The hardware is designed to provide dual functions and to operate as "one of many", rather than performing only a single-function (i.e., master or slave) and/or operating as one of a predetermined number. One software-configurable hardware design both minimizes costs and enhances scalability.

Another aspect of the current invention is a phase-locking technique that switches between frequencies that are higher and lower than the nominal frequency of the phase reference, and relies on phase coincidence detection to maintain phase lock. The switching frequencies may be programmable, and can be selected to fall within the operating frequency range of the spindle. This phase-locking technique is implemented in firmware and makes use of hardware commonly used merely to achieve spindle speed control.

The phase-locking technique leads to several advantages. Because the disk drive can operate at only one of two programmable frequencies both within its operating range, the disk drive can continue to operate properly even if the spindle reference signal were not present or became noisy or erratic. Therefore, there is no need for a standby phase reference if such a situation should occur, or for any apparatus to detect such a condition and switch over to such a standby. Furthermore, normal disk data transactions can occur during the synchronization process, because the disk is always operating within its specified rotational speed range.

Finally, apparatus in accordance with the invention also employs diagnostic features to enable detection of faulty signals and components, thus enhancing the testability of the disk drive.

BRIEF DESCRIPTION OF THE DRAWINGS

An embodiment of the invention will be described with reference to the accompanying drawings, in which.

DESCRIPTION OF THE PREFERRED EMBODIMENT

Figure 1:
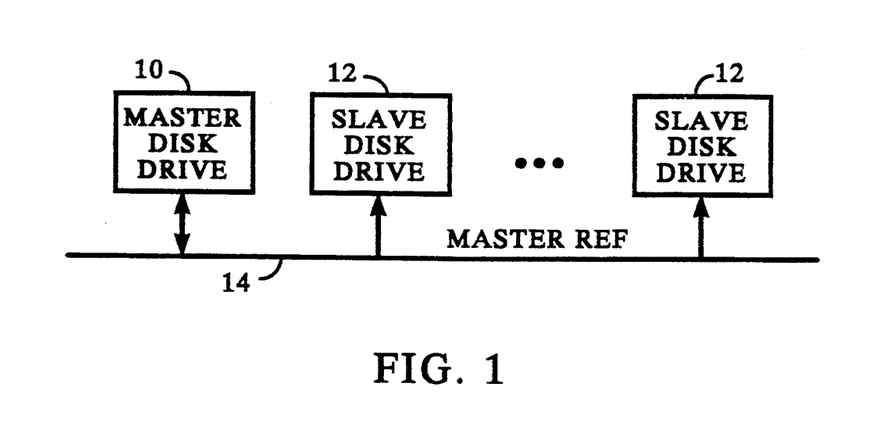
FIG. 1 is a block diagram of a disk storage system having multiple disk drives according to the principles of the invention.

FIG. 1 shows a disk storage system consisting of multiple independent disk drives, configured as a master disk drive 10 and a number of slave disk drives 12. In the illustrated embodiment the master disk drive 10 is identical in construction to each slave disk drive 12, but is configured slightly differently via software in a manner described below with reference to FIG. 3. As shown, all of the disk drives 10, 12 are connected to a wire 14 carrying a signal called MASTER REF. The signal MASTER REF is a master phase reference signal used to synchronize the operation of the disk drives 10, 12. As shown, the master disk drive 10 both transmits and receives the signal MASTER REF, whereas the slave disk drives 12 only receive it.

Figure 2:
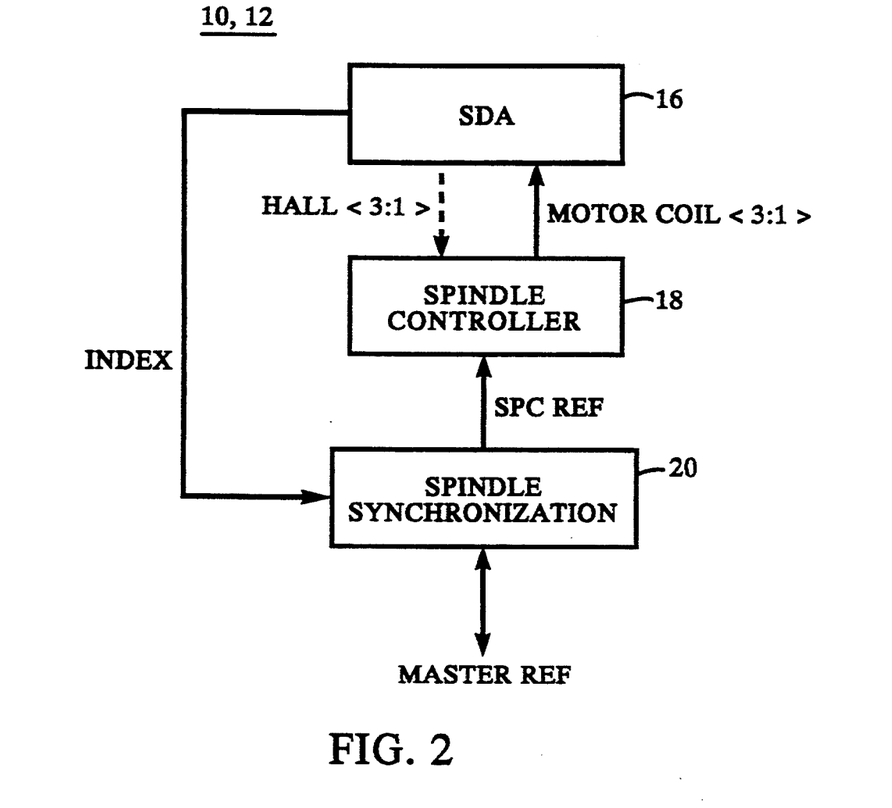
FIG. 2 is a block diagram of one of the disk drives of FIG. 1.

FIG. 2 shows the drives 10, 12 in more detail. Each drive has a spindle-disk assembly (SDA) 16 having a conventional 3-phase DC spindle motor with one or more annular disks mounted thereon; a spindle controller 18 to control the rotation of the SDA 16; and a spindle synchronizer 20 that is responsible for synchronizing the rotation of the SDA 16 with the signal MASTER REF. As shown, the spindle synchronizer 20 provides a signal SPC REF to the spindle controller 18, and receives a signal INDEX from the SDA 16. The spindle controller 18 provides current to the spindle on the wires labelled MOTOR COIL<3:1>. And in some embodiments, there may be a set of signals HALL<3:1> generated within the SDA 16 and sent to the spindle controller 18. These signals, if present, are generated by conventional Hall-effect sensors located on the spindle within the SDA 16 to provide rotational position feedback to the spindle controller 18.

The signal SPC REF is a spindle phase reference signal to which the spindle controller 18 phase-locks the SDA 16. The signal SPC REF is derived from the signal MASTER REF; its generation is described in detail below.

The signal INDEX is a pulse waveform, each pulse occurring once per rotation of the SDA 16 when it is in a predetermined rotational position. In the illustrated embodiment, the INDEX pulse is generated when a synchronization pattern that is recorded in a predetermined location on a disk within the SDA 16 passes under a readback head located within the SDA 16. In alternative embodiments, INDEX could be generated in response to different recorded information, or by a sensor that detects when the disk is in a predetermined rotational position.

As will be shown, the periods of the signals MASTER REF and SPC REF are programmable within a range of 5–20 milliseconds (ms). In the illustrated embodiment, their periods are programmed to be 11.111 ms, which corresponds to a rotational period of 90 Hz. Also, in the illustrated embodiment the pulse width of the signal SPC REF is in the range of 200–260 microseconds (us), -and that of signal MASTER REF is in the range of 5–30 us.

Figure 3:
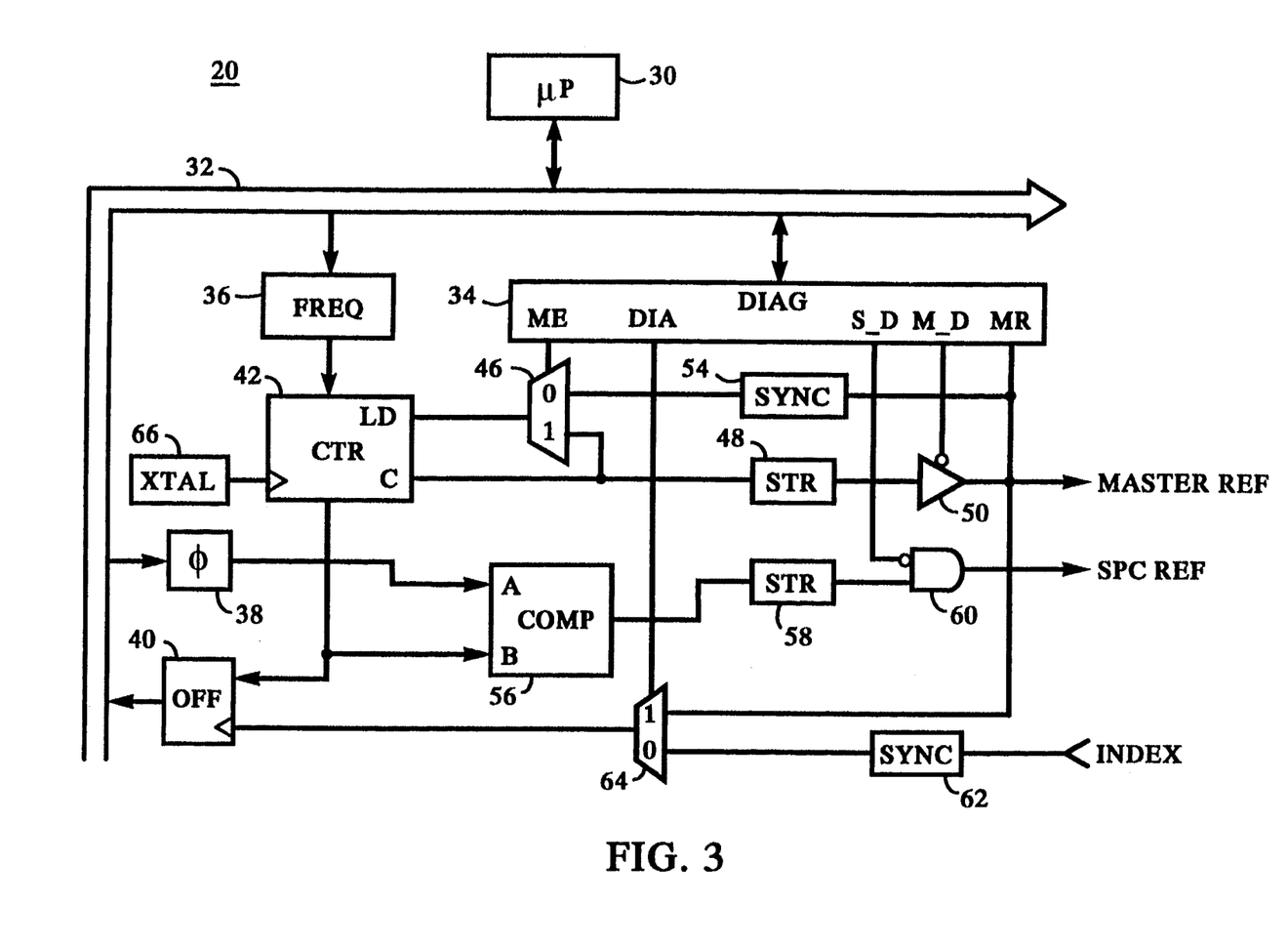
FIG. 3 is a block diagram of a spindle synchronizer within the disk drive of FIG. 2.

FIG. 3 shows the spindle synchronizer 20 of FIG. 2 in greater detail. As shown, the spindle synchronizer 20 contains a conventional microprocessor 30 connected to a data bus 32, to which are connected several other components: a 5-bit diagnostic and control register 34, a 16-bit frequency register 36, a 16-bit phase register 38, and a 16-bit offset register 40. A 16-bit up-counter 42 is loaded once per revolution from the frequency register 36. The carry output from the counter 42 goes to one input of a multiplexer (mux) 46 and also to a pulse stretcher 48, whose output goes to a driver 50. The output of the driver 50 is connected to the wire carrying the signal MASTER REF of FIG. 2. The signal MASTER REF also passes through a conventional dual-ranked synchronizer 54 on its way to the other input of the mux 46, whose output goes to the load enable input of the counter 42.

The output from the counter 42 is provided to the inputs of the offset register 40 and a 16-bit comparator 56. The other input to the comparator 56 is from the phase register 38. The output of the comparator 56 goes to another pulse stretcher 58, whose output goes to an AND gate 60. The output of the AND gate 60 is the signal SPC REF of FIG. 2. The signal INDEX of FIG. 2 goes through another dual-ranked synchronizer 62, whose output goes to one input of a mux 64. The other input to the mux 64 is the signal MASTER REF; the output of the mux 64 is routed to the clock input of the offset register 40.

The following elements in FIG. 3 are clocked by 2.5 MHz crystal clock, not shown in FIG. 3: the counter 42, the synchronizers 54 and 62, and the pulse stretchers 48 and 58. This clock is the time base for the operation of the circuit shown in FIG. 3. Alternative embodiments may employ clocks having different frequencies; in such embodiments, some of the register values to be described may differ from those used in the illustrated embodiment in a way that will be apparent to those skilled in the art.

The pulse stretchers 48, 58 are of conventional design, and operate to provide the necessary pulse widths, already described, for the signals MASTER REF and SPC REF.

The diagnostic and control register 34 has 5 bits used to control and monitor the spindle synchronizer 20. The following table gives the names, functions, and accessibility from the bus 32 of the diagnostic bits:

| # | Name | Acc. | Function |
|---|------|------|----------|
| 0 | MR | R | MASTER REF input state. Allows uP to determine current state of signal MASTER REF. |
| 1 | ME | R/W | MASTER ENABLE. When set to "ONE", counter operates independently. When set to "ZERO", counter loading controlled by signal MASTER REF. |
| 2 | M_D | R/W | MASTER REF OUTPUT DISABLE. When set to "ONE", driver does not drive MASTER REF. When set to "ZERO", driver does drive MASTER REF. |
| 3 | S_D | R/W | SPC REF OUTPUT DISABLE. When set to "ONE", AND gate does not drive SPC REF. When set to "ZERO", AND gate does drive SPC REF. |
| 4 | DIA | R/W | DIAGNOSTIC MODE. When set to "ONE", offset register clocked by MASTER REF. When set to "ZERO", offset register clocked by signal INDEX. |

The non-diagnostic operation of the spindle synchronizer 20 will now be described; for such operation, the DIA bit in the diagnostic and control register 34 is "ZERO". To begin with, the microprocessor 30 initializes the frequency register 36 and phase register 38. The values stored in these registers will be referred to as FREQ and PHASE, respectively.

For 90 Hz operation, the counter 42 must have a period of 11.111 ms, which corresponds to 27,778 periods of the 2.5 MHz clock. Since the counter 42 is an up counter, it counts from FREQ up to 65,536 ($2^{16}$); therefore FREQ is set to $65,536 - 27,778 = 37758$.

The value in the phase register 38, PHASE, can generally be anywhere in the count range of the counter 42 (i.e., between FREQ and 65,535). However, its value must be sufficiently less than 65,535 to ensure proper operation despite normal frequency differences between the local clock and the clock that generates the signal MASTER REF. The maximum safe value for the phase register 38 is called MAX, and it can be determined based on the relative tolerance between the local clock and the clock that generates the signal MASTER REF. For example, consider a case where the relative tolerance is 0.02%. This tolerance translates to an uncertainty of $\pm 14$ counts; in such a case, then, MAX is $65,536 - 14 = 65,522$. Clearly other values of MAX are possible for other clock tolerances.

The comparator 56 provides a pulse when the value in the counter 42 matches the value in the phase register 38; this pulse passes through the pulse stretcher 58 and the AND gate 60 to generate a pulse in the signal SPC REF. The signal SPC REF, therefore, has the same frequency as MASTER REF, but has an initial phase offset therefrom, the initial phase offset being determined by the value in the phase register 38. The spindle controller 18 of FIG. 2 phase locks to the signal SPC REF in a manner described in more detail below with reference to FIGS. 7–10. The microprocessor 30 waits for this phase locking to occur before taking additional steps. The microprocessor 30 can monitor the value in the OFFSET register 40 to determine when phase lock has been achieved; it is indicated when the value is no longer changing by more than some predetermined small amount, such as $\pm 2$ counts.

Figure 4:
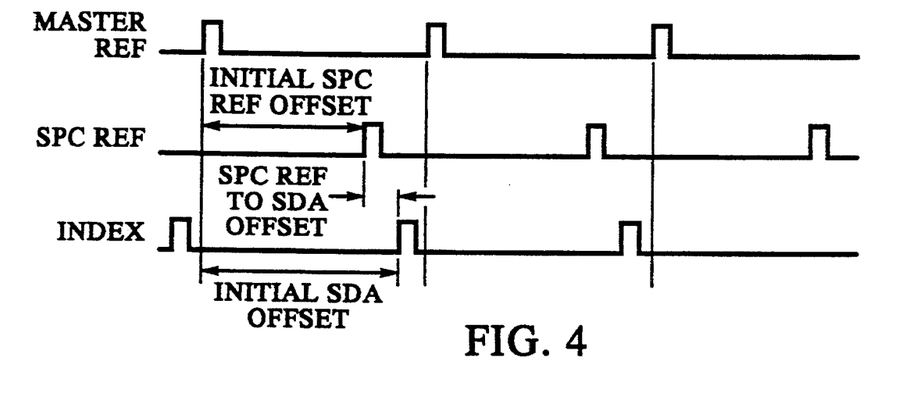
FIG. 4 is a timing diagram of signals generated and used by the spindle synchronizer of FIG. 3.

When phase lock has occurred, the SDA 16 of FIG. 2 has an initial rotational phase offset from the signal MASTER REF that in general differs from the initial phase offset of the signal SPC REF. An example of this situation is shown in FIG. 4, where the signal INDEX indicates a predetermined rotational position of the SDA 16. The difference between these two initial phase offsets is the phase offset between SPC REF and the SDA. This "SPC REF to SDA offset" does not change substantially after the SDA 16 has phase locked to the signal SPC REF.

After phase lock has occurred, then, the value in the offset register 40 of FIG. 3 (called OFFSET) represents the initial SDA rotational offset. The microprocessor uses this value to compute a new PHASE value to phase-align the SDA 16 with the signal MASTER REF. This computation proceeds as follows:

(1) PHASE is subtracted from OFFSET to yield a number called RESULT.
(2) If RESULT is between FREQ and MAX, then PHASE is set equal to RESULT.
(3) Otherwise, PHASE is set equal to [65,536+RESULT −FREQ]. This number may need rounding to either MAX or FREQ.

This action has the effect of shifting the signal SPC REF relative to the signal MASTER REF. When the spindle controller 18 re-acquires phase lock, the SDA rotation (as indicated by the signal INDEX) is phase-aligned with the signal MASTER REF, as shown in FIG. 5.

Figure 5:
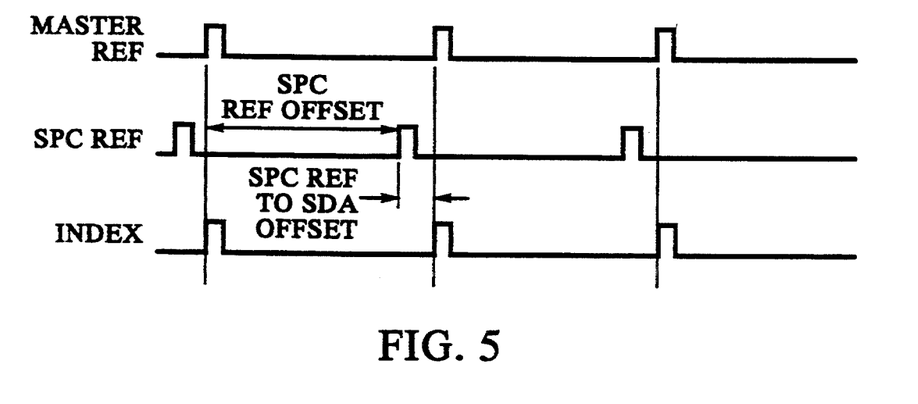
FIG. 5 is a timing diagram of signals generated and used by the spindle synchronizer of FIG. 3.
Figure 6:
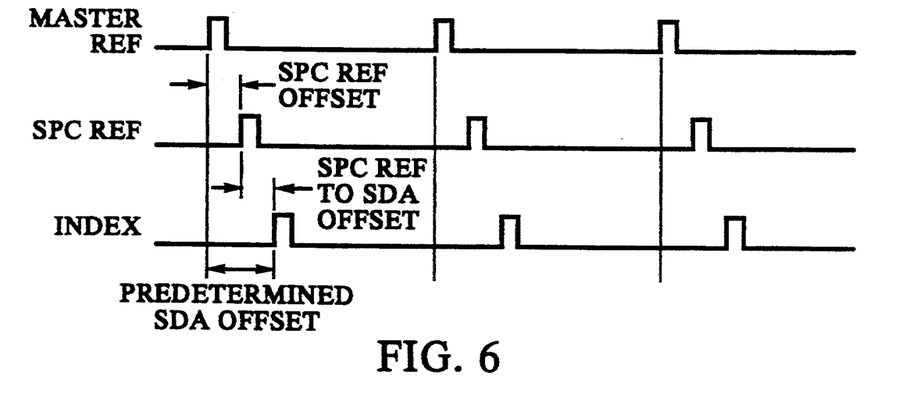
FIG. 6 is a timing diagram of signals generated and used by the spindle synchronizer of FIG. 3.

Although FIG. 5 shows precise phase alignment between the signal INDEX and the signal MASTER REF, in some cases it may be advantageous to have a predetermined non-zero phase offset between them. For example, if the disk drives 10, 12 are accessed sequentially for data during operation, it may be beneficial to have them offset from each other by approximately the duration of a single access, so that no time is lost waiting for proper disk positioning between accesses. An example of a non-zero offset is shown in FIG. 6. Such a non-zero predetermined phase offset can be achieved by modifying step (1) above as follows: (1) PHASE is subtracted from (OFFSET+predetermined phase offset) to yield RESULT.

While in the illustrated embodiment the signals MASTER REF and SPC REF have the same frequency, it will be clear to one skilled in the art that the frequency of the signal MASTER REF may be a multiple of the frequency of the signal SPC REF in alternative embodiments that employ a frequency divider or similar means of deriving the signal SPC REF from the signal MASTER REF.

Similarly, although in FIG. 3 an AND gate 60 is used to couple the output of the comparator 56 to the SPC REF output of the spindle synchronizer 20, this coupling may be achieved by other means in alternative embodiments. For example, a simple driver may be used if the AND function is not required. If the loading on the signal SPC REF is sufficiently small, the output of the comparator 56 may itself be used to drive the signal SPC REF.

The diagnostic and control features of the spindle synchronizer 20 of FIG. 3 will now be described. The MR bit in the diagnostic register 34 allows the microprocessor to determine the state of the signal MASTER REF. This capability is useful for testing the circuitry associated with the signal MASTER REF, such as the driver 50 and the wire 14 of FIG. 1. Also, it allows the microprocessor 30 to determine approximately when a transition of the signal MASTER REF occurs, and therefore to roughly synchronize its operation with the rest of the spindle synchronizer 20. Such rough synchronization enables the microprocessor 30 to do things at the appropriate times. For example, the microprocessor 30 should not load the phase register 38 near a transition of the signal SPC REF. It should also read the offset register 40 only when its contents are stable, i.e., not near a transition of the signal INDEX, which by clocking the offset register 40 may change its contents.

The ME bit in the diagnostic register 34 controls whether the counter 42 counts independently or is reloaded by the signal MASTER REF, which may be driven by another disk drive. This bit is set to "ONE" in a master disk drive 10, and typically is a "ZERO" in a slave disk drive 12. However, this bit can be set to "ONE" whenever independent counting is desired, for example during diagnostic testing or when the signal MASTER REF is not functioning properly.

The M_D bit controls the driver 50 used to drive the signal MASTER REF. This bit is programmed to "ZERO" in a master disk drive 10, and to "ONE" in a slave disk drive 12.

The DIA bit in the diagnostic register 34 controls the clock to the offset register 40. When DIA is a "ZERO" (i.e., normal, non-diagnostic operation), the synchronized version of the signal INDEX clocks the offset register 40. When DIA is a "ONE", the signal MASTER REF clocks the offset register 40. Therefore the offset between the counter 42 and the incoming signal MASTER REF can be monitored. This feature allows the microprocessor 30 to determine if the incoming signal MASTER REF is operating properly.

Figure 7:
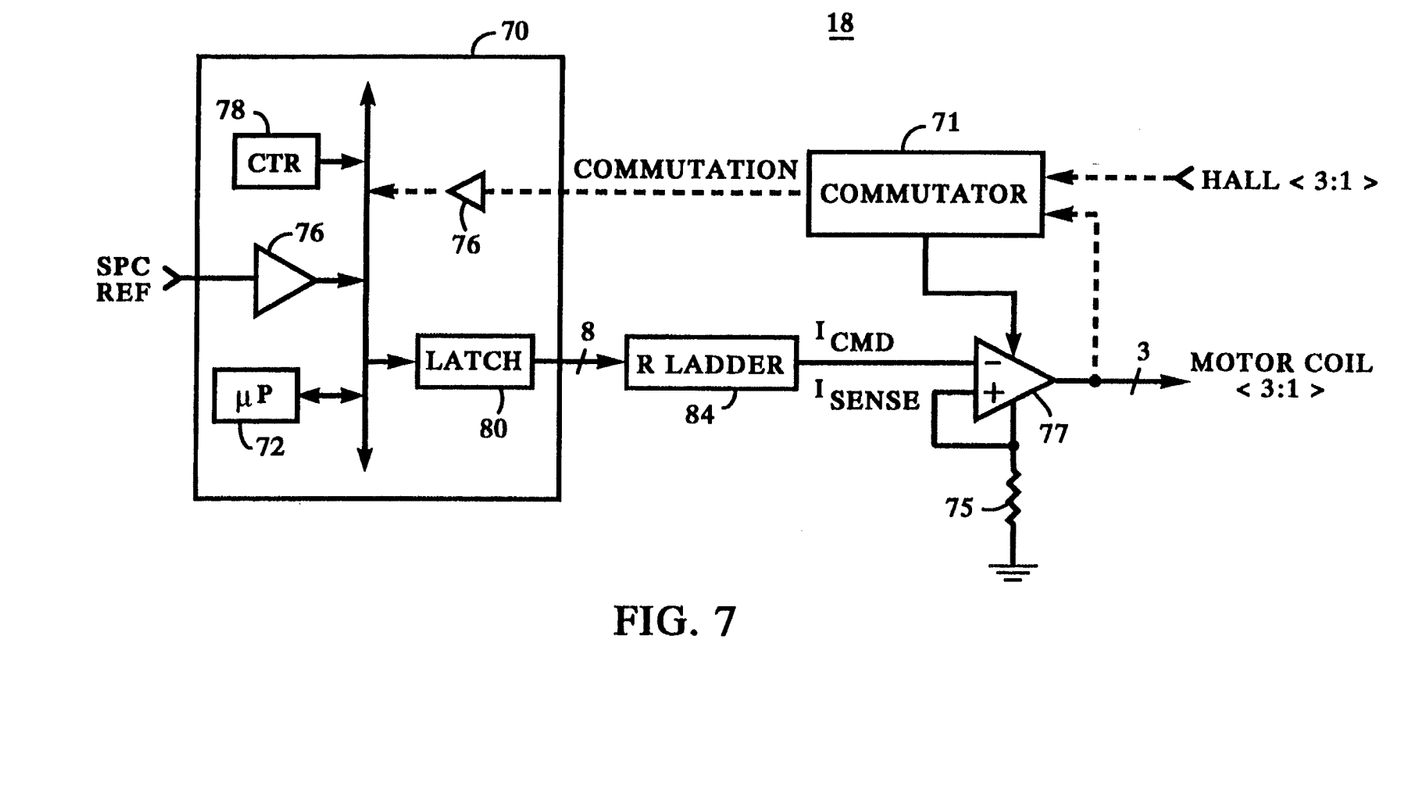
FIG. 7 is a block diagram of a spindle controller within the disk drive of FIG. 2.

Turning now to FIG. 7, the spindle controller 18 of FIG. 2 is shown in greater detail. The circuitry shown in FIG. 7 controls the rotational frequency of the SDA 16 and also phase-locks the SDA 16 to the signal SPC REF. A microcontroller 70 and resistor ladder 84 provide a voltage signal ICMD that indicates the desired spindle current. Transconductance amplifiers 77 provide the current signals MOTOR COIL<3:1> that drive the spindle. A conventional commutator 71 controls the switching of the amplifiers 77. The current in the final stage of the amplifiers 77 is sensed as a voltage signal ISENSE developed across a sense resistor 75, which is fed back to the input of the amplifiers 77 to control their drive strength.

The commutator 71 can be either of two broad types, sensorless or sensored. A sensored commutator obtains positional feedback via the signals HALL<3:1> output by Hall-effect devices if present within the SDA 16 of FIG. 2. A sensorless controller monitors the back-EMF voltage appearing on signals MOTOR COIL<3:1> in order to obtain positional feedback. In one embodiment, a sensorless commutator 71 and portions of the amplifiers 77 are contained in the ML4410 Sensorless Spindle Motor Controller available from Micro Linear Corp. This IC provides an output labelled COMMUTATION in FIG. 7 that indicates the occurrence of each commutation. The function of the commutator 71 may also be carried out by the microcontroller 70, in which case it receives the signals HALL<3:1> to derive position information.

Within the microcontroller 70, a microprocessor 72 is connected via a bus 74 to input buffers 76, a 16-bit counter 78, and an 8-bit latch 80. Input buffers 76 receive the signal SPC REF of FIG. 2 and COMMUTATION if necessary. In the illustrated embodiment, the counter 78 is a free-running down counter, i.e., it repetitively counts from $2^{16}$ down to 0. The latch 80 is connected to the resistor ladder network 84 to implement a digital-to-analog converter (DAC). Alternative embodiments may of course employ an integrated DAC in the place of the latch 80 and ladder network 84.

The input buffers 76 allow the microprocessor 72 to sample or poll the state of the signals SPC REF and COMMUTATION. It will be appreciated that in alternative embodiments these signals could instead be used to interrupt the microprocessor 72 so that their state may be monitored.

In the illustrated embodiment, both the microprocessor 72 and the counter 78 are clocked by a crystal clock, not shown, having a frequency of 1MHz and a tolerance of 0.01%. In alternative embodiments these components could be clocked by different clocks if suitable synchronization is provided. Also, clocks having different frequencies and tolerances may be employed with suitable modification of the operation of the microcontroller 70 that will be apparent to those skilled in the art.

A preferred microcontroller 70 is a COP 820 microcontroller manufactured by the National Semiconductor Co. However, there may be alternative embodiments apparent to those skilled in the art that employ different microcontrollers or perhaps use discrete components. Also, although the microcontroller 70 and commutator 71 are shown as separate components, their physical implementation may overlap without affecting the principles of the invention set forth herein.

The operation of the circuitry of FIG. 7 will be described for sensorless applications, i.e., those applications wherein the signal COMMUTATION is provided to the microcontroller 70. This description will be equally applicable to the sensored application, except that in the sensored application the microcontroller 70 monitors the signals HALL<3:1> instead of COMMUTATION to track the rotation of the spindle.

The microprocessor 72 counts transitions of the signal COMMUTATION to track the actual rotation of the SDA 16. In the illustrated embodiment, there are 24 commutations per revolution; there may be a different number of commutations in alternative embodiments. The microprocessor 72 also maintains a table of samples of the free-running counter 78, where each entry in the table corresponds to one of the 24 commutations. The microprocessor 72 also maintains a 16-bit accumulator variable that functions as an integrating loop filter. The use of both the table and the accumulator are described in greater detail with reference to FIG. 8 below.

Figure 8:
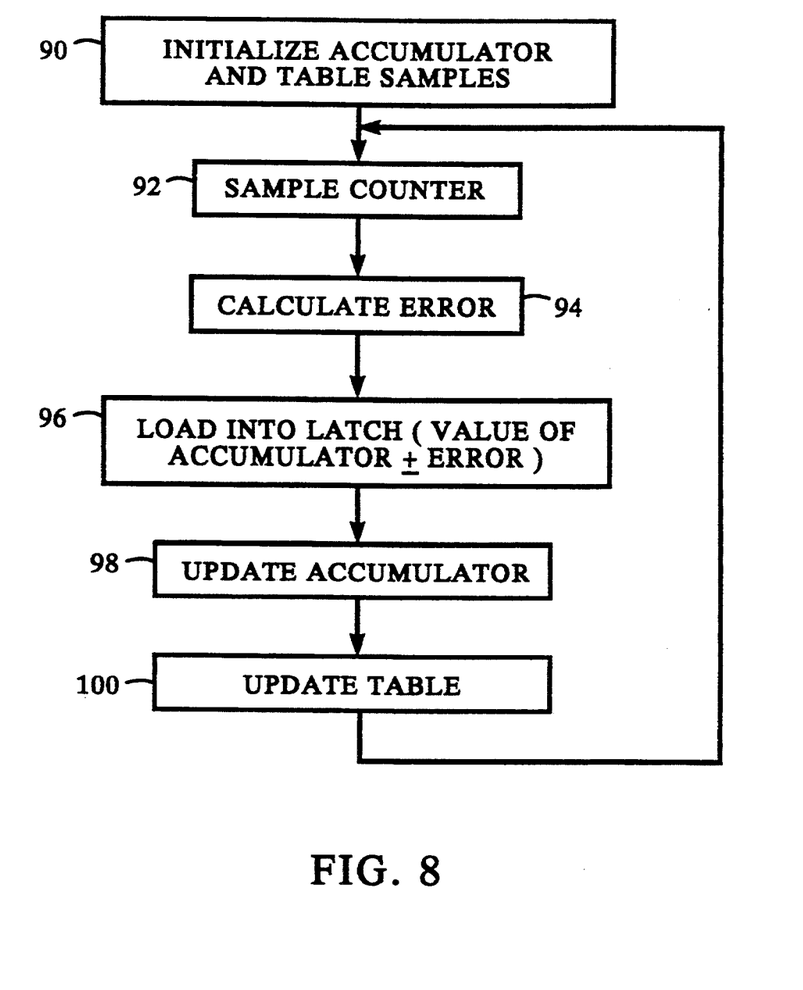
FIG. 8 is a flow diagram showing the frequency-locking operation of the spindle controller of FIG. 7.

FIG. 8 shows the steps carried out by the microprocessor 72 to control the rotational frequency of the SDA 16. In step 90, the accumulator and the table of counter samples are initialized. The accumulator is initialized by setting its low byte to zero, and its high byte to an initial value that corresponds to the approximate amount of current required from the amplifier 78 to overcome the frictional torque of the SDA 16. In other words, this initial value is sufficient to drive the SDA 16 at approximately the desired speed even in the absence of any finer control. This initial value is best determined empirically for any particular embodiment of the present invention. Additionally, initialization of the accumulator helps to minimize the amplitude of normal settling transients.

It should be noted that alternative embodiments may not require the initialization of the accumulator to a non-zero value as described above. Within the COP 820, however, the microprocessor 72 has only 8 bits of mathematical precision, and therefore has more limited calculating range than, say, a 16- or 32-bit microprocessor. When an 8-bit microprocessor is used, initializing the accumulator to a non-zero value results in less likelihood of mathematical underflow or overflow during steady-state operation. If a 16- or 32-bit microprocessor is used, the calculating range may be sufficiently wide to obviate this initialization step.

The table of counter samples is initialized by sampling the counter 78 upon each of the 24 positive transitions of the signal COMMUTATION in a revolution. This initialization provides a set of time stamps that are subsequently used to monitor the rotational period of the SDA Steps 92 through 100 are then repeated for every positive transition of the signal COMMUTATION. The microprocessor 72 knows when each revolution of the SDA 16 is complete by counting 24 positive transitions of the signal COMMUTATION.

In step 92, the counter 78 is sampled to obtain the time stamp for the present commutation.

In step 94, the error in the rotational period is calculated as follows:
(i) The current sample is subtracted from the table entry corresponding to the present commutation. This difference represents the actual number of crystal clock periods between the present commutation and the same commutation one revolution ago.
(ii) The number calculated in (i) is subtracted from an ideal number of clock periods per rotation to obtain the error value. The ideal number of clock periods is a function of both the rotational speed of the SDA 16 and the period of the clock 82. For example, if the SDA ideally rotates at 5400 RPM (90 Hz), the ideal number of 1-MHz clock periods per rotation is 11,111.

After the error value is calculated, the microprocessor 72 in step 96 loads into the latch 80 the sum or difference (depending on the polarity of the error value) between the high byte of the accumulator and the error value. This of course represents an instantaneous phase correction of the SDA 16. This number is converted to a voltage on the signal ICMD by the ladder network 84. The amplifiers 77 then adjust the currents on MOTOR COIL<3:1> until ISENSE equals ICMD. In particular, if the calculated error value is positive, the SDA 16 is rotating too fast. In this case, the magnitude of the currents on MOTOR COIL<3:1> are decreased. The opposite happens if the error value is negative.

In step 98, the microprocessor 72 adds or subtracts the error value (depending on its polarity) to or from the accumulator. The result of this operation may alter the high byte of the accumulator, and therefore may affect the correction applied during the next revolution.

In step 100, the microprocessor 72 replaces the table entry corresponding to the present commutation with the new sample obtained in step 92, to be used in the next revolution of the SDA 16.

The steps shown in FIG. 8, then, enable the spindle controller 18 to control the rotational frequency of the SDA 16. The spindle controller 18 also carries out additional functions to phase lock the rotation of the SDA 16 to the signal SPC REF. This capability contributes to the synchronization of multiple disk drives in accordance with the principles of the invention.

Figure 9:
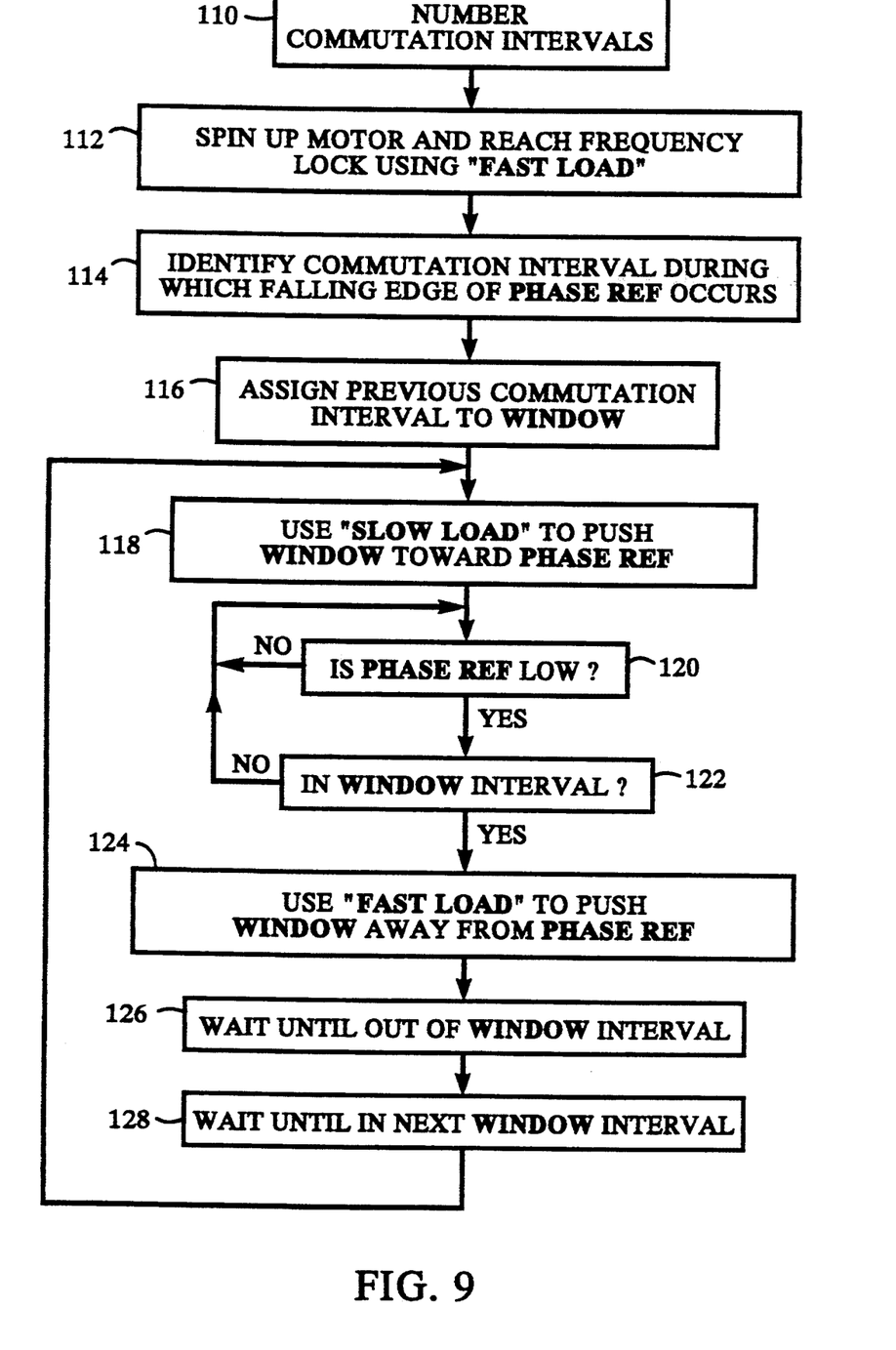
FIG. 9 is a flow diagram showing the phase-locking operation of the spindle controller of FIG. 7.

The details of the phase locking operation are shown in FIG. 9. Two slightly different "ideal" rotational period values are chosen. These values are called FAST LOAD and SLOW LOAD, and correspond to frequencies that are respectively higher and lower than the nominal frequency of the signal SPC REF. For example, the values 11,107 and 11,115 may be used for FAST LOAD and SLOW LOAD, respectively. These values correspond to the frequencies 90.033 Hz and 89.969 Hz. The microprocessor 72 monitors the SPC REF signal, and switches between the two frequencies in a fashion that maintains phase alignment between the SDA 16 and the signal SPC REF.

Figure 10:
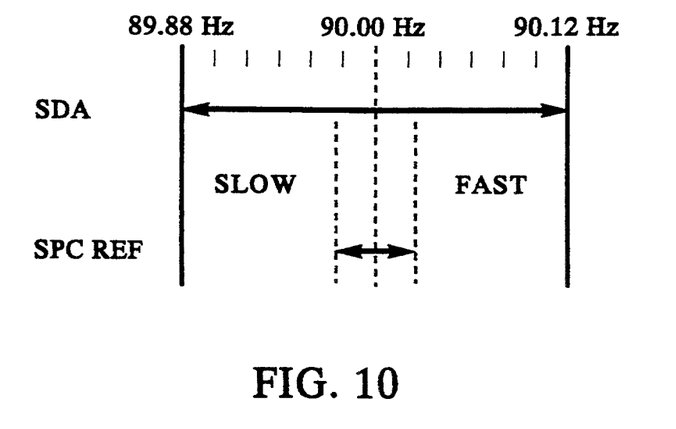
FIG. 10 is a diagram showing the range of operating frequencies of various components and signals within the disk drive of FIG. 2.

The values of FAST LOAD and SLOW LOAD dictate the boundaries of the range of average frequencies at which the SDA 16 can operate. This range, as shown in FIG. 10, should be broader than the frequency tolerance of the signal SPC REF, and narrower than the rotational frequency tolerance of the SDA 16. In this way it is possible for the spindle controller 18 to track the phase of the signal SPC REF without exceeding the specified rotational frequency limits of the SDA 16.

Returning to FIG. 9, the phase locking operation of the circuitry of FIG. 7 will now be described. In FIG. 9, the term "commutation interval" is used to mean the interval between two successive ones of the 24 commutations per revolution of the SDA 16. At step 110, the microprocessor 72 assigns the numbers 1 to 24 to sequential commutation intervals, starting at an arbitrary commutation interval; this numbering is thereafter maintained. At step 112, the SDA 16 is spun up, using the FAST LOAD value, until its rotational frequency is within the operating range shown in FIG. 10. Then at step 114, the microprocessor 72 seeks the falling edge of the signal SPC REF, and identifies the commutation interval in which it occurs. In step 116, the commutation interval immediately preceding the noted commutation interval is designated as a "window" commutation interval. For example, if the falling edge of the signal SPC REF occurs during the 13th commutation interval of the rotation, then the 12th commutation interval is designated as the window commutation interval.

Figure 11:
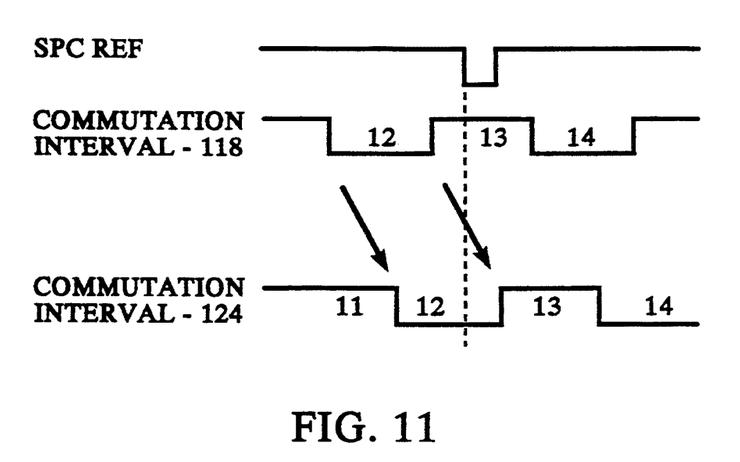
FIG. 11 is a timing diagram of signals within the spindle controller of FIG. 7.

At the end of step 116, then, a window phase interval of rotation of the SDA 16 has been established. At the beginning of step 118, the approximate phase of the SDA 16 relative to the signal SPC REF is indicated by the line "COMMUTATION INTERVAL—118" in FIG. 11. Note that FIG. 11 follows the above example wherein interval 12 is assigned as the window interval. This window interval is used in the remaining steps to establish and maintain phase lock.

At step 118 of FIG. 9, the microprocessor 72 switches to the SLOW LOAD value. This of course has the effect of slowing the SDA 16 down, and in particular pushes the window interval toward the falling edge of the signal SPC REF. In steps 120 and 122 the microprocessor 72 waits until the SDA 16 has slowed sufficiently so that the falling edge of the signal SPC REF occurs in the window interval; this may take anywhere from one to many revolutions of the SDA 16. This "sliding" of the commutation intervals relative to the signal SPC REF is indicated by the arrows in FIG. 11. At the beginning of step 124, the approximate phase of the SDA 16 is indicated by the line "COMMUTATION INTERVAL—124" in FIG. 11. Then in step 124 the microprocessor 72 switches back to the FAST LOAD value, and in steps 126 and 128 it waits one revolution of the SDA 16 before repeating the whole procedure starting at step 118.

The algorithm of FIG. 9 controls the phase of the SDA 16 such that it tracks the phase of the signal SPC REF. It does this by switching between higher and lower frequencies, using FAST LOAD and SLOW LOAD, such that an edge of the signal SPC REF occurs at least once in every repetition of the steps 118–128, which in general takes 2 or more revolutions of the SDA 16. Phase lock is maintained by varying the proportion of high- to low-frequency operation in a manner responsive to the signal SPC REF.

Although in the illustrated embodiment the microprocessor 72 waits one revolution before repeating the steps of FIG. 9, it may in alternative embodiments wait any predetermined number of revolutions. However, one revolution is preferred because it minimizes the spacing between samples of the signal SPC REF, and therefore generally yields better phase tracking.

It will be readily seen by one skilled in the art that the above-described phase locking technique could be altered in many ways to provide similar functionality. For example, the use of FAST LOAD and SLOW LOAD could be switched around, so that the window interval approaches the edge of SPC REF when the SDA 16 is speeding up rather than slowing down. In such a case, step 116 would be altered to assign the succeeding interval rather than the previous interval. It is also easy to change steps 120 and 122 to seek the rising edge of SPC REF if that were advantageous.

It should be noted that the above-described method differs sharply from conventional phase-locking techniques. Traditional techniques generally detect and correct for both positive and negative phase excursions of the controlled signal relative to the reference. In contrast, a phase-locking technique in accordance with the principles of the invention merely detects phase coincidence, and is able to switch between higher and lower frequencies so that phase coincidence occurs once in a while. Such a technique is therefore easily incorporated into existing control systems that for whatever reason already have means for detecting phase coincidence. Additionally, the technique can enhance fault tolerance, because the SDA 16 can be made to always operate within its specified frequency limits. If the SPC REF signal were to become corrupted or to disappear entirely, the worst that would happen is that phase lock would not be maintained: the spindle would still rotate at either the higher or lower frequency, both of which can be programmed to fall within the SDA's specified frequency limits. Furthermore, normal disk activity can proceed entirely independently of phase-lock activity, so that the practice of the invention does not delay the starting of disk accesses.

What is claimed is:

1. A spindle synchronizer to synchronize the rotation of a spindle-disk assembly with the rotation of other spindle-disk assemblies, comprising:

a microprocessor;

a frequency register coupled to said microprocessor to receive therefrom a frequency value corresponding to the desired rotational period of said spindle-disk assemblies;

a counter coupled to said frequency register to receive said frequency value therefrom upon assertion of a load signal to appear on a load enable input and to generate on a carry output a carry signal;

a first driver coupled to said carry output of said counter to generate when enabled and in response to said carry signal a master reference signal common to all of said spindle-disk assemblies;

a first multiplexer to selectively couple either said carry signal or said master reference signal to said load enable input of said counter;

a phase register coupled to said microprocessor to receive therefrom a phase value corresponding to the desired phase offset of said spindle-disk assembly;

a comparator having inputs respectively coupled to said phase register and to said counter to indicate on an output whether the contents of said phase register match the contents of said counter;

a second driver coupled to said output of said comparator to receive the indication therefrom and to generate at an output a spindle reference signal to be provided to said spindle-disk assembly; and an offset register coupled to said counter to be loaded therefrom upon assertion of an index signal to be coupled thereto from said spindle-disk assembly, and coupled to said microprocessor to provide thereto an offset value corresponding to the phase offset of said spindle-disk assembly relative to said master reference signal.

2. A spindle synchronizer according to claim 1, further comprising:

a second multiplexer to selectively couple either said index signal or said master reference signal to said offset register to control the loading thereof; and a diagnostic register coupled to said microprocessor to receive therefrom diagnostic control bits, and coupled to said first and second drivers and said first and second muiltiplexers to control the operation thereof in accordance with said diagnostic control bits.

3. A disk drive, comprising:

a spindle-disk assembly to receive on inputs motor coil drive signals and to generate on an output a disk-position signal;

a spindle synchronizer to receive on respective inputs said disk-position signal and a master reference signal and to generate on an output a spindle reference signal derived from said master reference signal and having a phase offset therefrom that is adjustable in response to the phase offset between said disk-position signal and said master reference signal, wherein said spindle synchronizer comprises:

a microprocessor, a counter coupled to said microprocessor to be loaded once per period of said master reference signal with a frequency value provided by said microprocessor and corresponding to the frequency of said master reference signal to track the phase thereof, a phase register coupled to said microprocessor to receive therefrom a phase value corresponding to the desired phase offset of said spindle reference signal relative to said master reference signal, a comparator having inputs respectively coupled to said phase register and to said counter to indicate on an output whether the contents of said phase register match the phase of said master reference signal, means for coupling said output of said comparator to said output of said spindle synchronizer, and an offset register coupled to said counter to be loaded therefrom upon assertion of said disk-position signal to be coupled thereto from said spindle-disk assembly, and coupled to said microprocessor to provide thereto an offset value corresponding to the phase offset of said spindle-disk assembly relative to said master reference signal; and a spindle controller to receive on an input said spindle reference signal and to generate on outputs said motor coil drive signals effective to phase lock the spindle in said spindle-disk assembly to said spindle reference signal.

4. A disk drive according to claim 3, wherein said spindle controller comprises means for sensing the back EMF appearing on said motor coil drive signals to derive spindle position information.

5. A disk drive according to claim 4, wherein said sensing means comprises a zero-crossing detector to detect zero crossings of the back EMF appearing on said motor coil drive signals.

6. A disk drive according to claim 3, wherein said spindle-disk assembly comprises Hall-effect sensors having outputs coupled to said spindle controller to provide spindle position information thereto.

7. A disk drive according to claim 3, wherein said spindle-disk assembly comprises means for detecting a predetermined synchronization pattern stored on a disk therein to generate said disk-position signal.

8. A spindle synchronizer to synchronize the rotation of a spindle-disk assembly with the rotation of other spindle-disk assemblies, comprising:

means for generating when enabled a master reference signal common to all of said spindle-disk assemblies and having a predetermined frequency, wherein said means for generating a master reference signal comprises:

a counter to be loaded with a value corresponding to the period of said master reference signal upon assertion of a load signal to appear on a load enable input and to generate on a carry output a carry signal, a driver coupled to said carry output of said counter to generate when enabled said master reference signal in response to said carry signal, and means for selectively coupling either said carry signal or said master reference signal to said load enable input of said counter; and means for generating a spindle reference signal derived from said master reference signal and having a programmable phase offset therefrom.

9. A spindle synchronizer according to claim 8, wherein said coupling means comprises a multiplexer.

10. A spindle synchronizer according to claim 8, further comprising:

a frequency register coupled to said counter to provide said value thereto.

11. A spindle synchronizer according to claim 8, wherein said means for generating a spindle reference signal comprises:

a phase register to hold a value corresponding to the desired phase offset of said spindle reference signal relative to said master reference signal;

a comparator having inputs respectively coupled to said phase register and to said means for generating a master reference signal to indicate on an output whether the contents of said phase register match the phase of said master reference signal; and a driver coupled to said output of said comparator to receive the indication therefrom and to generate at an output said spindle reference signal.

12. A spindle synchronizer to synchronize the rotation of a spindle-disk assembly with the rotation of other spindle-disk assemblies, comprising:

means for generating when enabled a master reference signal common to all of said spindle-disk assemblies and having a predetermined frequency;

means for generating a spindle reference signal derived from said master reference signal and having a programmable phase offset therefrom;

a microprocessor coupled to both of said generating means to provide respectively thereto frequency and phase values corresponding respectively to said predetermined frequency and said programmable phase offset;

means for determining the phase of said master reference signal upon assertion of a signal indicating a predetermined rotational position of a disk in said spindle-disk assembly; and means for providing the determined phase value to said microprocessor.

13. A spindle synchronizer according to claim 12, wherein said determining means comprises:

a counter to be loaded with a value corresponding to the period of said master reference signal upon assertion of said master reference signal; and an offset register coupled to said counter to be loaded therefrom upon assertion of an index signal to be coupled thereto from said spindle-disk assembly.

14. A spindle synchronizer according to claim 12, wherein said providing means comprises:

an offset register coupled to said microprocessor to provide thereto the determined phase value.

15. A disk synchronizer to synchronize the rotation of a disk mounted in a spindle-disk assembly with the rotation of other disks mounted in other spindle-disk assemblies, comprising:

a master reference signal generator to provide when enabled a master reference signal common to all of said spindle-disk assemblies and having a predetermined frequency, wherein said master reference signal generator comprises:

a counter to be loaded with a value corresponding to the period of said master reference signal upon assertion of a load signal to appear on a load enable input and to generate on an output a carry signal, a driver coupled to said output of said counter to generate when enabled said master reference signal in response to said carry signal, and means for selectively coupling either said carry signal or said master reference signal to said load enable input of said counter; and a spindle reference signal generator to provide a spindle reference signal derived from said master reference signal and having a programmable phase offset therefrom.

16. A disk synchronizer to synchronize the rotation of a disk mounted in a spindle-disk assembly with the rotation of other disks mounted in other spindle-disk assemblies, comprising:

a master reference signal generator to provide when enabled a master reference signal common to all of said spindle-disk assemblies and having a predetermined frequency;

a spindle reference signal generator to provide a spindle reference signal derived from said master reference signal and having a programmable phase offset therefrom;

a microprocessor coupled to said master reference signal generator and to said spindle reference signal generator to provide respectively thereto frequency and phase values corresponding respectively to said predetermined frequency and said programmable phase offset; and a phase detector to determine the phase of said master reference signal upon assertion of a signal indicating a predetermined rotational position of said disk in said spindle-disk assembly, said phase detector being coupled to said microprocessor to provide the determined phase value to said microprocessor.

* * * * *